United States Patent
Brancheriau

(10) Patent No.: US 6,890,016 B2
(45) Date of Patent: May 10, 2005

(54) DASHBOARD ASSEMBLY AND VEHICLE COMPRISING THE ASSEMBLY

(75) Inventor: Christian Brancheriau, Meru (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 10/606,217

(22) Filed: Jun. 26, 2003

(65) Prior Publication Data

US 2004/0056503 A1 Mar. 25, 2004

(30) Foreign Application Priority Data

Jun. 26, 2002 (FR) .......................................... 02 07931

(51) Int. Cl.$^7$ ............................................. B62D 25/14
(52) U.S. Cl. ....................... 296/70; 296/72; 296/37.12; 296/193.02
(58) Field of Search ...................... 296/70, 72, 37.12, 296/193.02; 180/90

(56) References Cited

U.S. PATENT DOCUMENTS

| | | | | |
|---|---|---|---|---|
| 4,560,186 A | * | 12/1985 | Onitsuka et al. ............ 280/752 |
| 5,823,602 A | * | 10/1998 | Kelman et al. ............... 296/70 |
| 6,095,272 A | * | 8/2000 | Takiguchi et al. ............ 180/90 |
| 6,139,082 A | * | 10/2000 | Davis et al. .................. 296/72 |
| 6,155,631 A | * | 12/2000 | Yoshinaka et al. ...... 296/193.02 |
| 6,422,633 B2 | * | 7/2002 | Neuss et al. ................. 296/70 |
| 6,502,888 B2 | * | 1/2003 | Inoue et al. .................. 296/72 |
| 6,685,259 B1 | * | 2/2004 | Shimase et al. ....... 296/203.02 |

FOREIGN PATENT DOCUMENTS

| | | |
|---|---|---|
| DE | 73 11 644 | 7/1973 |
| EP | 0 061 846 | 10/1982 |
| JP | 02037056 | 2/1990 |
| JP | 02099440 | 4/1990 |

* cited by examiner

Primary Examiner—D. Glenn Dayoan
Assistant Examiner—Greg Blankenship
(74) Attorney, Agent, or Firm—Young & Thompson

(57) ABSTRACT

Dashboard assembly includes a structural element extending in a direction of elongation, flanges produced in one piece with the structural element and extending substantially perpendicularly to the direction of elongation and a housing being connected to the flanges by way of releasable retaining elements, in order to permit the displacement of the housing relative to the flanges under the action of a load, greater than a determined threshold, exerted in a longitudinal direction which is substantially perpendicular to the direction of elongation and substantially horizontal, and to hold the housing in position relative to the flanges when the housing is subjected to loads lower than the given threshold in the longitudinal direction.

20 Claims, 3 Drawing Sheets

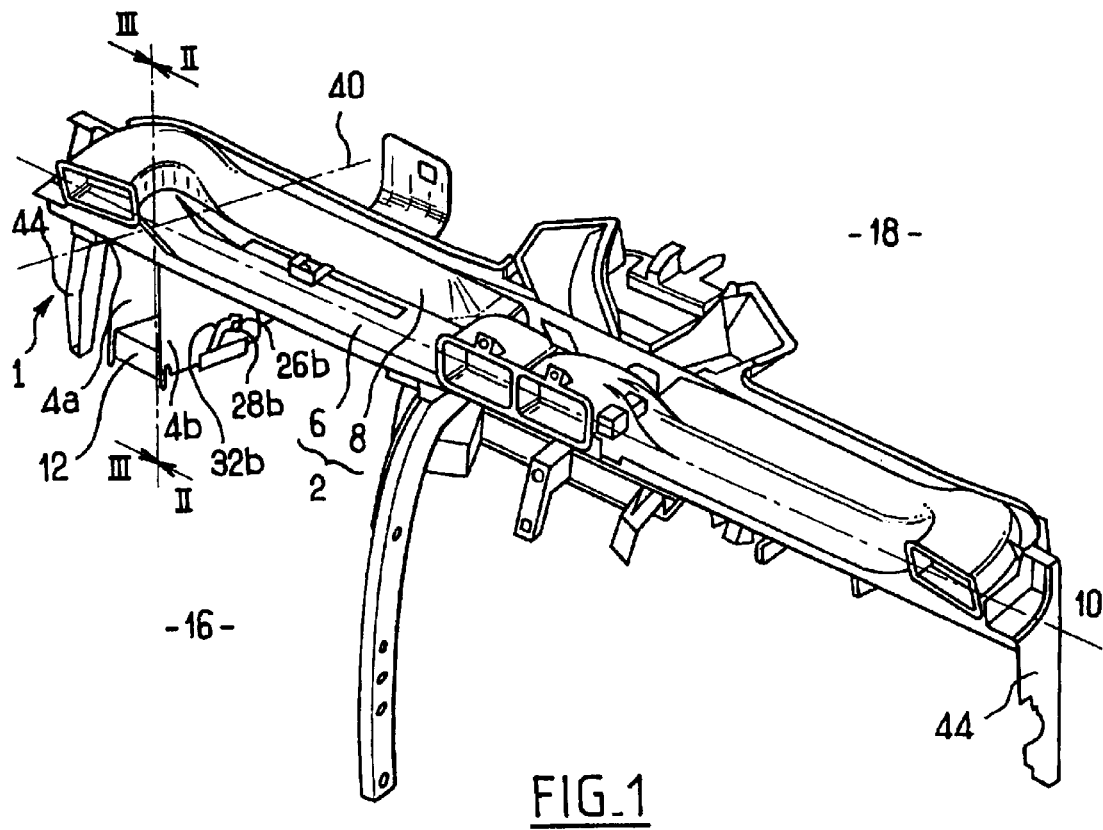
FIG_1
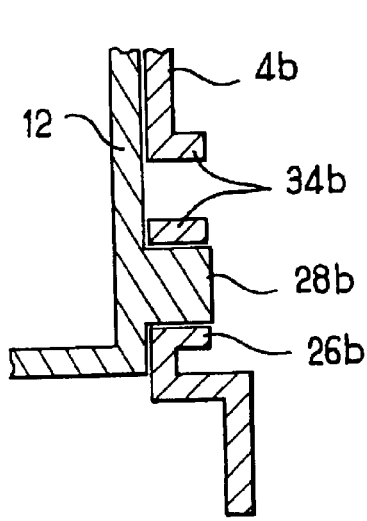
FIG_4
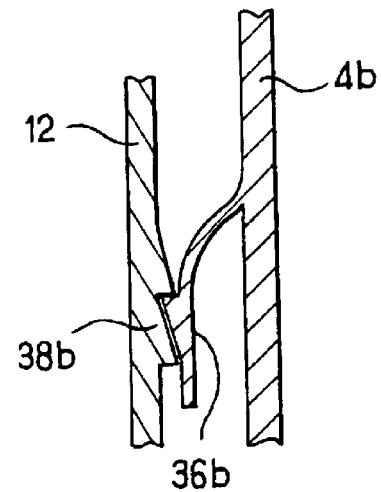
FIG_5

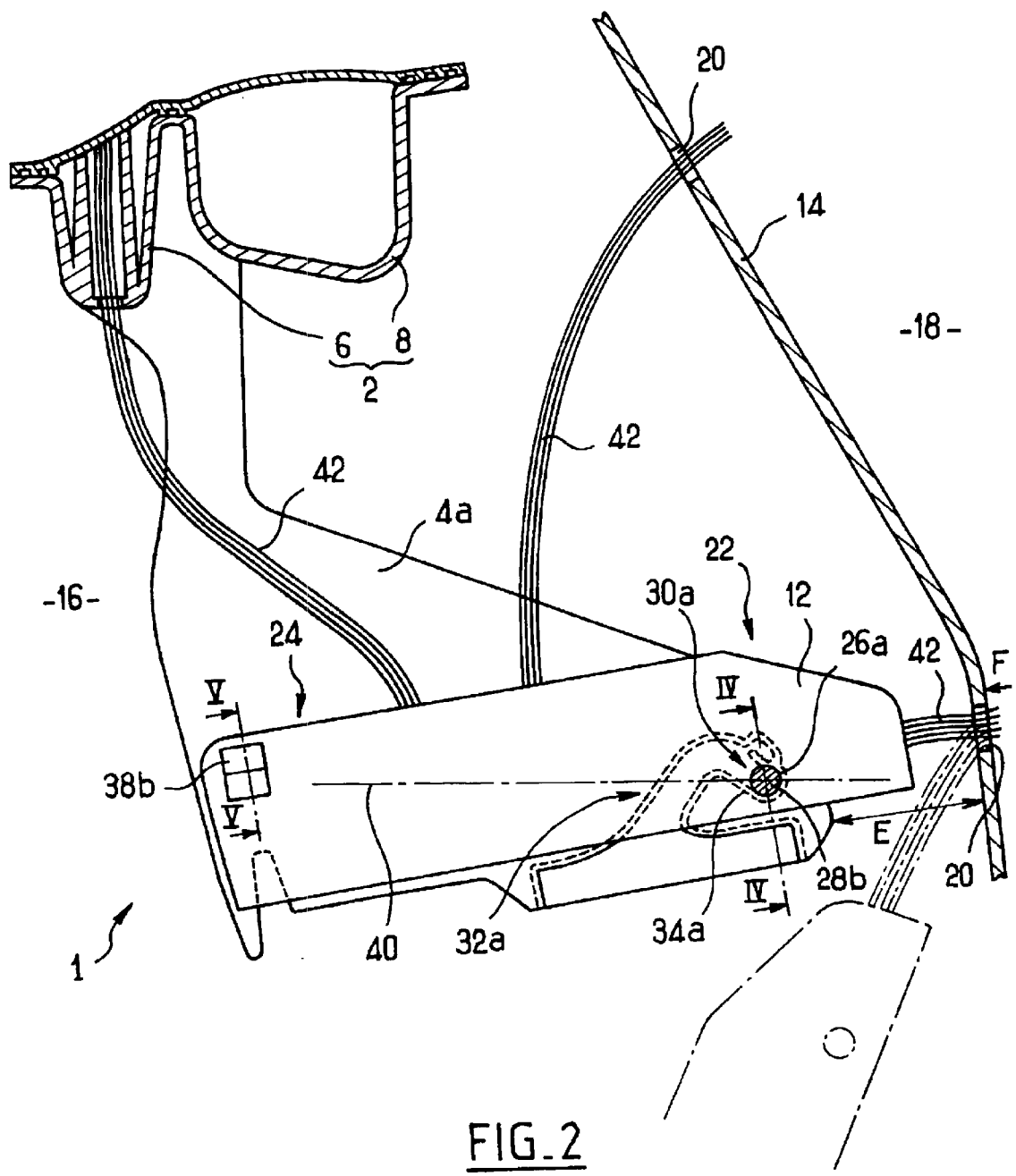
FIG_2

DASHBOARD ASSEMBLY AND VEHICLE COMPRISING THE ASSEMBLY

BACKGROUND OF THE INVENTION

1. Field of the Invention

The invention relates to a dashboard assembly and to a vehicle comprising such an assembly.

To be more precise, the aim is to integrate a housing, such as an electrical housing, especially a fuse-carrier housing or the like, in the dashboard at minimum cost, while at the same time ensuring absolute safety for the occupants of the vehicle in the case of impact.

2. Description of the Prior Art

This housing is generally removably mounted in a support between a normal, retracted, use position and a maintenance position in which the fuses and other electrical or electronic components are accessible. It is generally located in the vicinity of the firebreak bulkhead of the vehicle (separation between the engine compartment and the passenger space) to which it is secured, because numerous electrical cables from the engine compartment are connected thereto.

In the case of front impact, since the bulkhead penetrates into the inside of the passenger space, there is a risk that the housing will hit the passengers. In particular, in the case of a fuse-carrier housing, which is generally disposed to the left of the driver, in the vicinity of the A-pillar (front support of the vehicle structure) and at the lower portion of the dashboard, in the case of impact, there is a risk that the housing will collide either with the A-pillar of the vehicle or with the left knee of the driver.

SUMMARY OF THE INVENTION

The object of the invention is to solve this problem without notably increasing the cost of the dashboard. In order to do this, according to the invention, the assembly comprises:

- a structural element extending in a direction of elongation,
- flanges being an integral part of the structural element and extending substantially perpendicularly to the direction of elongation,
- a housing connected to the flanges by way of releasable retaining means, in order:
  - to permit the displacement of the housing relative to the flanges under the action of a load, greater than a determined threshold, exerted in a longitudinal direction which is substantially perpendicular to the direction of elongation and substantially horizontal, and
  - to hold the housing in position relative to the flanges when the housing is subjected to loads lower than the given threshold in the longitudinal direction.

Thus, since the housing is connected to the structural element by way of the flanges, the connection between the housing and the bulkhead can be dispensed with. Consequently, when the bulkhead penetrates into the inside of the passenger space and collides with the housing, the releasable retaining means release the housing relative to the flanges, so that there is no risk that it will damage the A-pillar or the driver's knee.

By producing the flanges at the same time as the structural element of the dashboard, the cost of producing the housing support is reduced and time is saved in mounting the housing on the dashboard.

In order further to reduce the risk of injury to the passengers, according to the invention, the assembly has the following additional features:

- the housing extends in the longitudinal direction between a front end and a rear end,
- the releasable retaining means comprise a front portion disposed in the vicinity of the front end and a rear portion separate from the front portion and disposed in the vicinity of the rear end.

The separation of the releasable retaining means into a front portion and a rear portion makes it possible to obtain both good retention and a release of the housing after slight translation (a few centimeters at most) of the housing relative to the flanges, in contrast with a slide which requires translation over a distance at least equal to half the length of the housing before the latter is released, if it is desired that the slide should hold the housing in position in a satisfactory manner under normal conditions.

Advantageously, the releasable retaining means comprise two radially open bores which are substantially Ω-shaped and which are resiliently deformable, and two studs which are inserted tightly in the bores.

Such retaining means are relatively simple, inexpensive, reliable and sturdy.

Preferably, the Ω-shaped bores have a radial opening directed slightly upwards.

Thus, there is less risk that the weight of the housing will cause an inadvertent release of the housing relative to the flanges, in particular under the action of vibration.

According to an additional advantageous feature, the releasable retaining means also comprise two curved rails which extend each of the Ω-shaped bores in such a manner as to guide the studs.

Thus, the displacement of the housing relative to the flanges is controlled after release, which consequently reduces the risk that the housing will hit the occupants of the vehicle or a portion of the vehicle.

Furthermore, the determined load threshold beyond which the releasable retaining means permit the displacement of the housing is advantageously from 10 newtons to 100 newtons.

Thus, by means of the releasable retaining means, the housing is held in position relative to the flanges sufficiently securely not to be released under the action of vibration, and it can be released, especially for a maintenance operation, by exerting a moderate force.

The invention relates also to a vehicle comprising a passenger space containing the assembly and a front engine compartment separated from the passenger space by a bulkhead. According to the invention, there is a space separating the flanges from the bulkhead.

A space is therefore available for absorbing energy in the case of impact, before the bulkhead collides with the structure of the dashboard via the flanges. This space can be obtained, on the one hand, owing to the fact that the housing is held in position on the dashboard structure and not on the bulkhead and, on the other hand, by the release of the connection between the flanges and the housing.

Advantageously, the flanges are spaced from the bulkhead by at least 30 millimeters.

BRIEF DESCRIPTION OF THE DRAWINGS

The invention will emerge even more clearly from the following description which is given with reference to the appended drawings in which:

FIG. 1 is a perspective view of an assembly according to the invention,

FIG. 2 is a sectional view according to the line marked II—II in FIG. 1,

FIG. 4 is a sectional view according to the line marked IV—IV in FIG. 2,

FIG. 5 is a sectional view according to the line marked V—V in FIG. 2.

DESCRIPTION OF THE PREFERRED EMBODIMENT

Figure 3:
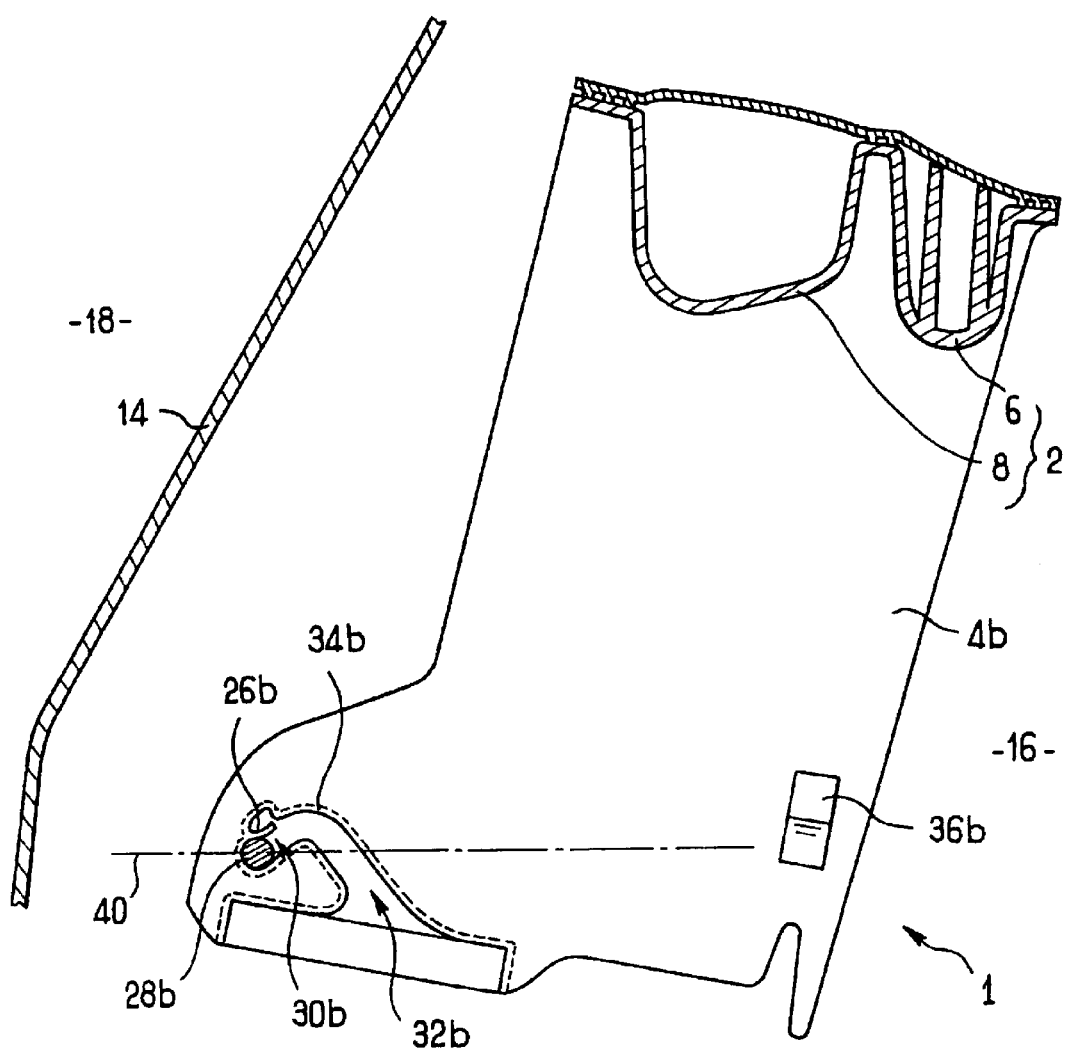
FIG. 3 is a sectional view according to the line marked III—III in FIG. 1.

The Figures illustrate a vehicle dashboard assembly 1 which is to be located between the fire-protection bulkhead 14 and the passenger space 16 of a vehicle. This assembly comprises, in particular, a structural element 2 extending transversely in the vehicle in a direction of elongation 10, lateral flanges 4a, 4b extending substantially perpendicularly to the direction of elongation 10 and a housing 12 extending between the two flanges 4a, 4b.

The structural element extends between the front pillars 44 of the vehicle and here comprises a ribbed cross-member 6 and a ventilation duct 8 adjoining the cross-member 6. The cross-member 6 and the ventilation duct 8 are produced from plastics material, which is advantageously moulded over a metal core, and are moulded in one piece with the flanges 4a, 4b.

The housing 12 is here constituted by an integrated equipment box and, more precisely, an independent housing containing fuses and various electrical elements. The box is located in the vicinity of the bulkhead 14 because a large number of electrical wires 42 are connected to the engine compartment 18 of the vehicle, passing through holes 20 formed in the upper and lower portions of the bulkhead 14. In general, it is positioned, as illustrated, in the lower portion of the dashboard, between the driver's knees and the adjacent front pillar 44 of the vehicle.

In addition, some electrical wires 42 extend along the cross-member 6 to supply the electrical equipment of the dashboard.

The flanges 4a, 4b each extend, in a longitudinal direction 40 which is perpendicular to the direction of elongation 10 and substantially horizontal, between a front end 22 located in the vicinity of the bulkhead 14 and a rear end 24. In the vicinity of the front end 22, the flanges 4a, 4b each have a bore 26a, 26b extending in the direction of elongation 10 and receiving a stud 28b which is fixedly joined to the housing 12. The bores 26a, 26b each have a radial opening 30a, 30b, so that they have a substantially Ω-shaped cross-section. Thus, it is possible to engage the studs 28b in the bores 26a, 26b in order to retain the housing 12 relative to the flanges 4a, 4b, or to release them by resilient deformation of the bores 26a, 26b.

In order to prevent the studs 28b from being inadvertently released, under the action of the jolting of the vehicle, the radial openings 30a, 30b are disposed substantially at the top of the bores 26a, 26b. And, in order to simplify the engagement of the studs 28b in the bores 26a, 26b, guide rails 32a, 32b are arranged in the flanges 4a, 4b. These guide rails 32a, 32b are substantially in the shape of a "comma" extending the bores 26a, 26b.

The bores 26a, 26b and the guide rails are produced by moulding with the flanges 4a, 4b. In addition, in order to improve sturdiness, each of the flanges incorporates a rib 34a, 34b bordering each of the bores 26a, 26b and each of the guide rails 32a, 32b.

Each of the flanges 4a, 4b also comprises a resilient tab 36b disposed in the vicinity of the rear end 24 of the flanges.

These tabs cooperate with notches 38b formed on the housing to complete the releasable fastening of the housing 12 to the flanges 4a, 4b.

If the vehicle is subjected to substantial front impact, the result is a displacement of the bulkhead 14 towards the passenger space 16 under a force F. The bulkhead 14 then hits the housing 12, which action releases the studs 28b from the bores 26a, 26b and the resilient tabs 36b from the notches 38b. In the vicinity of the rear end 24, the housing is completely released while, in the vicinity of the front end, the studs 28b are guided along the rails 32a, 32b, so that the housing tilts downwards by pivoting about the studs 28b. The studs 28b then move in translation along the guide rails 32a, 32b before exiting therefrom and being completely released. The housing 12 is now held only by the electrical wires 42, as illustrated with a dot-dash line in FIG. 2.

The thrust force of the bulkhead is then not transmitted to the housing, as long as the bulkhead does not collide with the flanges 4a, 4b. The flanges are advantageously separated from the bulkhead by a space E of at least 30 millimeters, and preferably 40 millimeters, in order to absorb the energy of the front impact.

The releasable retaining means constituted by the studs 28b, the resiliently deformable bores 26a, 26b, the resilient tabs 36b and the notches 38b are dimensioned to release the housing beyond a force threshold which is advantageously from 10 newtons to 100 newtons, so that the housing can also be released for maintenance operations (for example, replacement of a fuse).

What is claimed is:

1. Dashboard assembly comprising:
   a structural element extending in a direction of elongation, said structural element including flanges which are an integral part of the structural element and extend in a longitudinal direction substantially perpendicular to the direction of elongation and substantially horizontal,
   releasable retaining means, and
   a housing connected to the flanges by way of said releasable retaining means and extending in the longitudinal direction, wherein,
   when the housing is subjected to loads lower than a given threshold in the longitudinal direction, said retaining means holds the housing in position relative to the flanges, and
   when the housing is subjected to loads higher than the given threshold in the longitudinal direction, said retaining means allow the displacement of the housing relative to the flanges under action of said loads, and, after slight translation of the housing relative to the flanges, release the housing.

2. Assembly according to claim 1, wherein the releasable retaining means comprise two radially open bores which are substantially Ω-shaped and which are resiliently deformable, and two studs (28b) which are inserted tightly in the bores.

3. Assembly according to claim 2, wherein the bores have a radial opening directed slightly upwards.

4. Assembly according to claim 2, wherein the releasable retaining means also comprise a curved rail which extends the Ω-shaped bores in such a manner as to guide the studs.

5. Assembly according to claim 2, wherein the bores are moulded with the flanges.

6. Assembly according to claim 1, characterized in that:
   the housing extends in the longitudinal direction between a front end and a rear end, the releasable retaining means comprise a front portion disposed in the vicinity of the front end and a rear portion separate from the front portion and disposed in the vicinity of the rear end.

7. Assembly according to claim 1, wherein the determined load threshold beyond which the releasable retaining means permit the displacement of the housing is from 10 newtons to 100 newtons.

8. Vehicle comprising a passenger space containing an assembly according to claim 1 and a front engine compartment separated from the passenger space by a bulkhead, wherein there is a space separating the flanges from the bulkhead.

9. Vehicle according to claim 8, wherein the flanges are spaced from the bulkhead by at least 30 millimeters.

10. Assembly according to claim 4, wherein, when the housing is subjected to loads higher than the given threshold in the longitudinal direction, the studs are released from the bores and are guided along the rail so that the housing tilts downwards by pivoting about the studs, and the studs then move in translation along the rail before exiting therefrom and being completely released.

11. Dashboard assembly comprising:
   a structural element extending in a direction of elongation,
   flanges being an integral part of the structural element and extending substantially perpendicularly to the direction of elongation,
   a housing connected to the flanges by way of releasable retaining means, in order:
      i) to permit the displacement of the housing relative to the flanges under the action of a load, greater than a determined threshold, exerted in a longitudinal direction which is substantially perpendicular to the direction of elongation and substantially horizontal, and
      ii) to hold the housing in position relative to the flanges when the housing is subjected to loads lower than the given threshold in the longitudinal direction,
   wherein the releasable retaining means comprise two radially open bores which are substantially Ω-shaped and which are resiliently deformable, and two studs (28*b*) which are inserted tightly in the bores.

12. Assembly according to claim 11, wherein the bores have a radial opening directed slightly upwards.

13. Assembly according to claim 11, wherein the releasable retaining means also comprise a curved rail which extends the Ω-shaped bores in such a manner as to guide the studs.

14. Assembly according to claim 13, wherein, when the housing is subjected to loads higher than a given threshold in the longitudinal direction, the studs are released from the bores and are guided along the rail so that the housing tilts downwards by pivoting about the studs, and the studs then move in translation along the rail before exiting therefrom and being completely released.

15. Assembly according to claim 11, wherein the bores are moulded with the flanges.

16. Assembly according to claim 11, wherein the determined load threshold beyond which the releasable retaining means permit the displacement of the housing is from 10 newtons to 100 newtons.

17. Dashboard assembly comprising:
   a structural element extending in a direction of elongation,
   flanges being an integral part of the structural element and extending substantially perpendicularly to the direction of elongation,
   a housing connected to the flanges by way of releasable retaining means, in order:
      i) to permit the displacement of the housing relative to the flanges under the action of a load, greater than a determined threshold, exerted in a longitudinal direction which is substantially perpendicular to the direction of elongation and substantially horizontal, and
      ii) to hold the housing in position relative to the flanges when the housing is subjected to loads lower than the given threshold in the longitudinal, wherein,
   the housing extends in the longitudinal direction between a front end and a rear end,
   the releasable retaining means comprise a front portion disposed in the vicinity of the front end and a rear portion separate from the front portion and disposed in the vicinity of the rear end.

18. Assembly according to claim 17, wherein the determined load threshold beyond which the releasable retaining means permit the displacement of the housing is from 10 newtons to 100 newtons.

19. Vehicle comprising a passenger space containing an assembly according to claim 17 and a front engine compartment separated from the passenger space by a bulkhead, wherein there is a space separating the flanges from the bulkhead.

20. Vehicle according to claim 19, wherein the flanges are spaced from the bulkhead by at least 30 millimeters.

* * * * *